Figure 1:
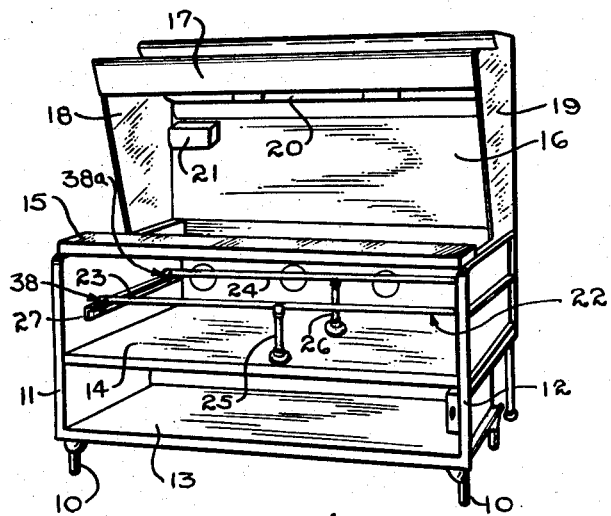

Oct. 11, 1960  C. R. CARLSON  2,955,715
GRIDDLE STAND
Filed June 10, 1957  2 Sheets-Sheet 1

INVENTOR.
Clifford R. Carlson
BY
Atty

Oct. 11, 1960
C. R. CARLSON
2,955,715
GRIDDLE STAND
Filed June 10, 1957
2 Sheets-Sheet 2
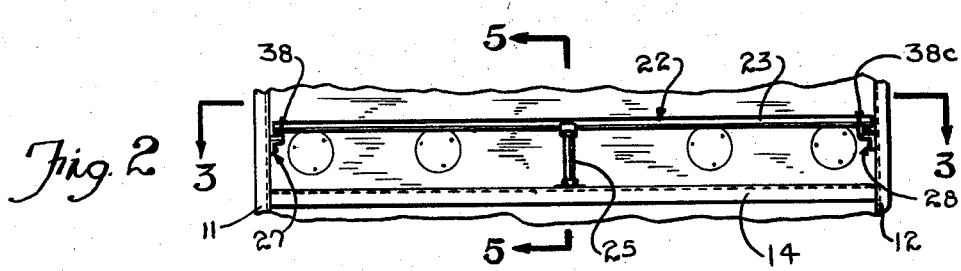
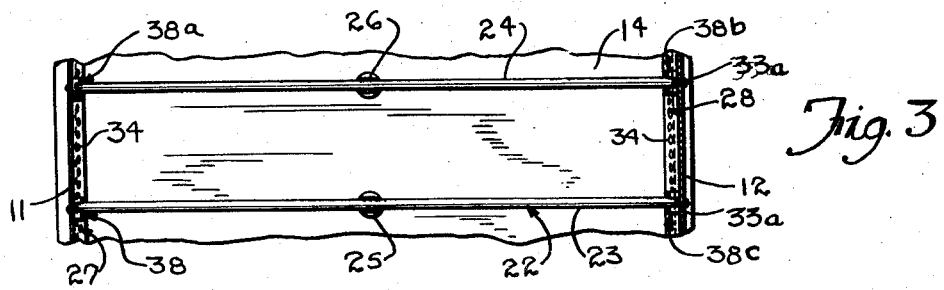
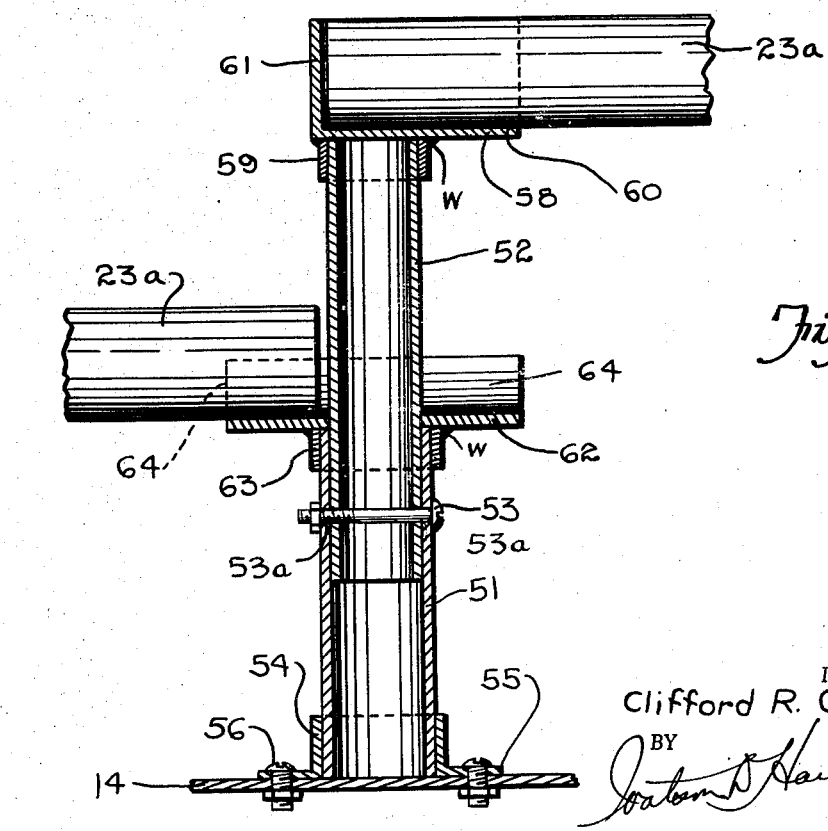
INVENTOR.
Clifford R. Carlson
BY
Atty United States Patent Office 2,955,715
Patented Oct. 11, 1960

2,955,715
GRIDDLE STAND

Clifford R. Carlson, Grand Haven, Mich., assignor to The Bastian-Blessing Company, Chicago, Ill., a corporation of Illinois Filed June 10, 1957, Ser. No. 664,576

11 Claims. (Cl. 211—147)

This invention relates to a griddle stand, and more particularly to an adjustable griddle stand permitting the tailoring thereof to the dimensions of various heating and cooking appliances to be used therewith.

Griddle stands are a familiar product being employed in restaurants, lunch counters, etc. It will be recalled that the stand when in use is equipped with a cooking or heating appliance of some type as, for example, a deep-fat fryer, burners, a grill table, etc. Such appliances vary one from another in that they are made by several manufacturers, and may derive their energy either from electricity or gas. It is desirable that the griddle stand be constructed so as to accommodate these various appliances so that the stand itself may be thought of as having universal application.

An object of this invention is to provide a griddle stand having features of adjustability built therein so that it will have generally universal utility in that it can be used with substantially all heating and cooking appliances. Still another object is in the provision of a griddle stand having an adjustable support assembly adapted to receive a cooking appliance thereon after adjustment of the support assembly to satisfy the dimensional requirements of such appliance. Yet another object is that of providing a griddle stand having a support assembly that is vertically adjustable so as to position an appliance supported thereon at a convenient elevation, and which is transversely adjustable for meeting the width requirements of the appliance.

Yet a further object of this invention is to provide a support assembly for use in griddle stands and the like, and which incorporates a pair of longitudinally extending rails carried by end supports that are vertically adjustable and that afford transverse adjustment so that the spacing between the rails may be selected to satisfy the measurements in any given appliance. Still a further object is in the provision of a support assembly as described, wherein legs are included intermediate the ends of the rails, and have special features of adjustability for dimensionally relating the heights thereof to the elevations established by adjustment of the end supports for the rails.

Yet a further object of this invention is to provide a griddle stand having the features of adjustability set forth, and in which the various structural elements are characterized by having closure or protective surfaces that tend to obviate the collection of grease and food particles thereabout. Additional objects and advantages of the invention will become apparent as the specification develops.

Embodiments of the invention are illustrated in the accompanying drawings, in which—

Figure 5:
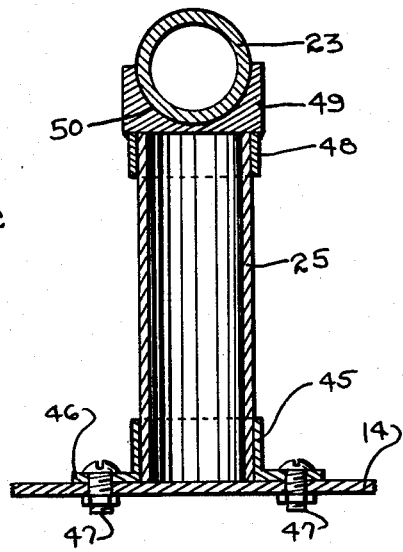
Figure 4:
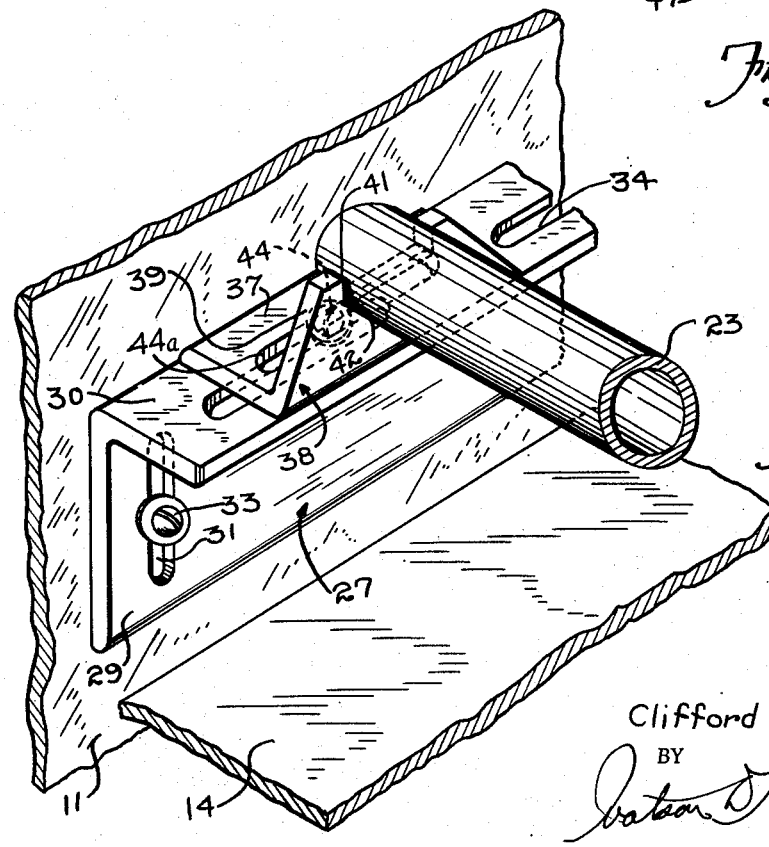

Figure 1 is a perspective view of a griddle stand embodying the invention; Figure 2 is a broken front view in elevation of the griddle stand showing the appliance support thereof; Figure 3 is a longitudinal sectional view taken along the line 3—3 of Figure 2, and showing essentially the appliance support or support assembly in top plan; Figure 4 is a broken perspective view of one of the transverse supports; Figure 5 is a vertical sectional view of a support leg and is taken along the line 5—5 of Figure 2; and Figure 6 is a vertical sectional view of a modified support leg with an extension telescoped thereinto.

The griddle stand illustrated in Figure 1 is a floor model, and is equipped with a plurality of legs 10 adapted to support the same. The stand has side walls 11 and 12, and interposed therebetween are a bottom shelf 13, an appliance shelf 14 and a wooden counter or work shelf 15. A back wall 16 extends upwardly along the rear edges of the sides 11 and 12 and shelves 13 and 14. Extending forwardly from the back wall 16 adjacent the upper end thereof is a hood 17 having depending skirts 18 and 19 whereby vapors and smoke, etc. are confined within the hood and are drawn outwardly therefrom by suitable exhaust means (not shown). An elongated light 20 may be included within the hood 17, and a grease container 21 may be removably secured to the back wall 16 below the elevation of the light 20.

Mounted within the enlarged compartment defined in part between the shelves 14 and 15 is an appliance support or mounting assembly designated in general with the numeral 22. The mounting assembly 22 comprises a pair of horizontally disposed rails 23 and 24 arranged in spaced apart, parallel relation and supported intermediate the respective ends thereof on legs 25 and 26, and at the ends thereof on transverse beams or supports 27 and 28 (Figure 2). The support assembly 22, and in particular the rails 23 and 24 thereof, are adapted to receive an appliance thereon which, it will be apparent, is then spaced above the appliance shelf 14 and will have a top substantially at the elevation of the work table 15. Such appliance may be of any suitable type operating on either gas or electricity, and may have any conventional work elements therein such as burners, deep-fat fryers, griddles, etc.

The transverse supports 27 and 28 are identical, and for that reason only one will be described in detail. As shown most clearly in Figures 2, 3 and 4, the supports are inverted, generally L-shaped angles defining a web 29 and flange or shelf 30. At each end, the web 29 is provided with a vertically extending, elongated slot 31. The supports are rigidly secured to the respective side walls of the stand by means of nuts and bolts 33 that extend through the slots 31 and through apertures 33a provided therefor in the side walls, and when tightened draw the web 29 of the transverse supports into tight frictional engagement with the respective inner surfaces of the side walls 11 and 12.

It will be apparent that the structural arrangement described affords a means for adjusting the elevation of the transverse supports 27 and 28, and more particularly the shelves or flanges 30 thereof above the appliance shelf 14. A considerable range of vertical adjustment is afforded by the elongated slots 31; and if the range of adjustment afforded by these slots is not sufficient, additional apertures may be provided in the side walls 11 and 12 so as to shift the starting point for the adjustment of the transverse supports.

Figures 3 and 4 illustrate that the flanges 30 of each of the transverse supports have a plurality of elongated slots 34. The flange 30 is adapted to receive thereon a base 37 of a bracket 38 having an upwardly extending leg or flange 39 provided with a channel 41 therein adapted to seat an end portion of the tubular rail 23 therein. Preferably, the rail 23 adjacent its ends is provided with an inwardly extending slot 42 alignable with the lower edge of the channel 41 for receiving the same therein. It will be apparent that such an arrangement prevents shifting of the rail 23 along the longitudinal axis thereof.

The bracket 38 is rigidly anchored in position on the flange 30 of the support 27 by means of a bolt assembly 44 which extends through an aperture 44a in the base 37 of the bracket and through one of the elongated slots 34 aligned therewith in the flange 30. This mounting arrangement for the bracket 38 permits adjustment thereof along the length of the transverse support 27, or transversely of the griddle stand, first because incremental adjustment is provided within the dimensional limits of each slot 34, and secondly because step-wise adjustment through repositioning of the bracket is accomplished simply by removing the bolt assembly 44 and shifting the bracket into an adjacent position along the base 37 to align the same with another of the slots 34. It will be evident from an inspection of Figures 1 and 3 that a bracket arrangement 38 is provided at each end of the rail 23, and also at each end of the rail 24. All of these bracket arrangements are identical in structure with the one described in detail, and for such reason no further descriptions thereof will be presented; and for purposes of differentiation, the other three bracket assemblies are denoted with the numerals 38a, 38b and 38c.

Since the transverse supports 27 and 28 are vertically adjustable, the intermediate support legs 25 and 26 must also be adjustable in their vertical dimension, and such adjustment thereof will be described in reference to Figure 5 which shows in detail the construction of the leg 25. The leg 26 is identical therewith. The leg 25 is generally tubular, and the lower end portion thereof telescopes or nests within the collar 45 having an outwardly extending annular flange 46 that rests against the upper surface of the appliance shelf 14 and is rigidly secured thereto by bolt assemblies 47 which extend through aligned apertures in the flange and shelf. At its upper end, the leg 25 telescopes into a depending annular collar 48 welded or otherwise rigidly secured to a seat support 49 having a semi-circular channel 50 extending longitudinally therethrough which receives the tubular rail 23 therein.

The ends of the leg 25 slidably seat within the respective collars 45 and 48, and preferably the ends of the collars (at least the lower collar 45) are crimped inwardly about the tubular leg so as to close any opening therebetween and prevent grease and food particles from collecting therein. The intermediate legs are supplied so as to initially have a length sufficient to satisfy the greatest vertical height to which the transverse supports 27 and 28 are adjustable; and as a consequence, any position of intermediate vertical adjustment of the transverse supports can be accommodated by the legs 25 and 26 simply by cutting them off to the requisite length.

In certain instances, the appliance supported on the rails 23 and 24 may comprise a pair of separate units, one having a greater height than the other or which should be positioned so that the tops thereof are at different levels. For example, one such appliance unit might be a griddle table, and the other a deep-fat fryer and burner combination. In such event, it might be more desirable to have the top of the burner combination located at an elevation above that of the griddle table. The units, however, would be in side-by-side relation. This would necessitate then segmented support rails 23 and 24, for one portion of the rails would need to be located above the other sections thereof. A support structure for permitting such arrangement is illustrated in Figure 6, which shows in detail an intermediate support leg for use therewith. No change would be necessitated in the transverse support members 27 and 28 for one thereof (support 28, considering the illustration of Figure 6) would simply be located a greater distance from the appliance shelf 14.

The support leg shown in Figure 6 comprises a pair of leg sections 51 and 52, the latter of which is of smaller diameter and is slidably or telescopically received within the section 51. The telescopic portions of these sections are provided with aligned apertures therein that pass the shank of a bolt assembly 53 therethrough so as to secure the sections together at the desired location. Initially, it is preferable to provide only the leg section 51 with a pair of apertures 53a therein, and upon adjustment of the relative heights of the sections 51 and 52 the remaining apertures are drilled therethrough. Thus, the leg sections will only have the precise number of apertures therein which are essential for receiving the bolt assembly 53.

The leg section 52 at the upper end thereof is equipped with a seat support 58 having a depending collar 59 welded or otherwise secured thereto for telescopically receiving the upper end of the leg section therein. The support 58 also has a semi-circular channel 60 extending longitudinally thereof that receives the end portion of a rail segment 23a therein. The opposite end of the rail segment 23a (not shown) will be carried by the bracket assembly 38c of the transverse support 28.

The rail segment 23a has the weight carried thereby transferred directly to the leg assembly through the base of the seat support 58 and, as a result, there is substantially no tendency for the support to cant or pivot with respect to the leg section 52. It will be noted that the seat support 58 is equipped with a vertical wall 61 providing an end closure for the channel 60, and it is abutted by the end of the rail segment 23a so as to close the same.

The leg section 51 is substantially identical to the one shown in Figure 5 and heretofore described, except that an opening is provided through the seat support so as to pass the upper leg section 52 therethrough. Thus, the section 51 is provided at its upper end with a seat support 62 having a depending collar 63 welded thereto at W which telescopically receives the upper end of the leg section therein. The seat support has a longitudinally extending channel 64 which at one end thereof receives the inner end portion of the rail segment 23a therein. The weight carried by the segment 23a is transferred directly to the lower leg section 51 through the base of the seat support 62.

With the configuration shown in Figure 6, a pair of appliance units may be supported at different elevations without the one interfering in any way with the mounting and support of the other. At the same time, the heights of the separate appliance units may be individually adjusted, simply by positioning the respective transverse supports 27 and 28 as heretofore described, and thereafter adjusting the respective heights of the leg sections 51 and 52 to correspond respectively thereto. In that regard, the section 51 has its elevation adjusted by cutting off the lower end thereof at the desired location, and then slipping it into the collar 54. The elevation of the upper section 52 is determined by telescoping it into the upper end of the leg section 51, and then anchoring it at the desired position by insertion of the bolt assembly 53 therethrough.

The structures described permit tailoring the griddle stand to the requirements of any installation, for the width or spacing between the rails 23 and 24 is selectively adjustable, as is the height of those rails or of the rail segments whichever the case may be. The adjustments are simple and effective, and as a result may be made on location at the time of installation. Further, longitudinal shifting of the rails is prevented because of the interlocking relation of the bracket flange 39 and recess receiving the same within the respective rails. Since the appliance is supported a spaced distance above the appliance shelf 14, it is easy to clean the shelf which, of course, is a desirable feature for grease spatter, etc. is bound to collect on the appliance shelf at times. Such spacing also affords room for the storage of materials below the appliance as, for example, plates which then will be warmed by downward radiation from the appliance, or cooked foods which will similarly retain their heat and be further warmed by the appliance thereabove.

It will be noted that though tubular rails and intermediate support legs are employed, the ends thereof which are located so that grease and food particles could readily collect therein, are closed so as to prevent such occurrence. More specifically, the intermediate leg 25 is completely closed off at both the top and bottom thereof, as are the leg sections 51 and 52. In this same regard, it is preferable to crimp the ends of the collars 45, 48, 54, 59 and 63 inwardly slightly so as to reduce the area of the abutment surfaces provided thereby, and so as to make them snug about the tubular legs and leg sections.

While in the foregoing specification embodiments of the invention have been set forth in considerable detail for purposes of making an adequate disclosure thereof, it will be apparent to those skilled in the art that numerous changes may be made in those details without departing from the spirit and principles of the invention.

I claim:

1. A support leg adapted for use in a griddle stand having a horizontally disposed shelf therein, comprising a collar securable to said shelf and extending upwardly therefrom, a leg section having an end thereof slidably positioned within said collar and adapted to bear downwardly against said shelf, said leg section at the upper end thereof defining a horizontally disposed wall portion, a seat support having an opening therethrough and having a portion thereof seated upon said horizontal wall, said seat support having a channel therein adapted to receive an end of a support rail therein, an additional leg section telescopically received within said first mentioned section and extending upwardly therefrom through said seat support, means for securing said leg sections at selected telescopic positions to constrain the same against relative longitudinal movement, said additional leg section having an upper end portion defining a generally horizontal wall, and a seat support positioned upon said generally horizontal wall of the additional leg section, said last mentioned seat support having a channel therein for receiving an end portion of a support rail.

2. In a griddle stand having a horizontal shelf and a pair of side walls extending upwardly therefrom, a pair of transverse supports adjustably carried respectively by said side walls for providing selective elevations with respect thereto, a pair of rail segments having outer ends carried respectively by said transverse supports and extending inwardly therefrom to provide adjacent inner end portions, a collar secured to said shelf and extending upwardly therefrom, a leg section having an end thereof slidably positioned within said collar and bearing downwardly against said shelf, said leg section at the upper end thereof defining a horizontally disposed wall portion below the upper end, a seat support having an opening therethrough and having a portion thereof seated upon said horizontal wall, said seat support receiving an inner end of one of said rail segments therein, an additional leg section telescopically received within said first mentioned section and extending upwardly therefrom through said seat support, means for securing said leg sections at selected telescopic positions to constrain the same against relative longitudinal movement, said additional leg section having an upper end portion defining a generally horizontal wall, and a seat support positioned upon said generally horizontal wall of the additional leg section, said last mentioned seat support receiving therein the inner end of the other of said rail segments.

3. The griddle stand of claim 2 in which each of said transverse supports is equipped with a bracket assembly adjustably mounted thereon, and in which the respective outer ends of the rail segments are carried by said bracket assemblies.

4. In a griddle stand of the character described having an appliance shelf and side walls extending upwardly therefrom a transverse support for each of said side walls and having an elongated slot therein, means extending through such slots and through said side walls for securing the transverse supports at selected vertical locations along said side walls, a pair of horizontally disposed rails arranged in spaced apart, substantially parallel relation extending between said side walls, and bracket means carried by each of said transverse supports and receiving the ends of said rails for supporting such rails thereupon, said transverse supports being equipped with a horizontally disposed shelf having a plurality of transversely extending, elongated slots spaced apart therealong, and in which each of said bracket means is provided with an opening therein alignable with selected locations along said transversely extending slots to afford adjustment of the spacing between said rails.

5. In a griddle stand of the character described having an appliance shelf and side walls extending upwardly therefrom, a transverse support for each of said side walls and having an elongated slot therein, means extending through such slots and through said side walls for securing the transverse supports at selected vertical locations along said side walls, a pair of horizontally disposed rails arranged in spaced apart, substantially parallel relation extending between said side walls, and bracket means carried by each of said transverse supports and receiving the ends of said rails for supporting such rails thereupon, said transverse supports being equipped with a horizontally disposed shelf having a plurality of transversely extending, elongated slots spaced apart therealong, and in which each of said bracket means is provided with an opening therein alignable with selected locations along said transversely extending slots to afford adjustment of the spacing between said rails, each of said bracket means being provided with an upwardly extending flange having a recess receiving the end of one rail therein, and in which the ends of said rails are provided with a notch for seating the wall portion of the flanges therein to constrain the rails against longitudinal movement with respect thereto.

6. In a griddle stand having sheet metal side walls, a support assembly adapted to receive an appliance thereon, said support assembly having a pair of spaced apart, substantially parallel rails for the receipt thereon of such appliance, an elongated transverse support disposed and adjacent to and beneath the opposite ends of said rails for supporting the same thereon and having lateral openings therethrough below said rails, and intermediate support legs in engagement upon their upper ends with the respective rails resting thereon for supporting the same, means extending through said openings and engaging said side walls for selectively adjusting the vertical location of said transverse supports with respect to said stand, and means for correspondingly adjusting the height of said legs.

7. In a griddle stand having sheet metal side walls, a support assembly adapted to receive an appliance thereon, said support assembly having a pair of spaced apart, substantially parallel rails for the receipt thereon of such appliance, an elongated transverse support disposed and adjacent to and beneath the opposite ends of said rails for supporting the same thereon and having lateral openings therethrough below said rails, and intermediate support legs in engagement upon their upper ends with the respective rails resting thereon for supporting the same, means extending through said openings and engaging said side walls for selectively adjusting the vertical location of said transverse supports with respect to said stand, and means for correspondingly adjusting the height of said legs, each of said support legs comprising a collar secured to said stand, a generally vertical leg post slidably received within said collar, and a seat support providing a continuous channel therein for receiving one of said rails, and a depending collar slidably receiving an end of said leg post therein, said leg post being made of two separable overlapping elements to afford adjustment of the length thereof to provide the aforesaid means for adjusting the height of said legs.

8. In a griddle stand having sheet metal side walls, a support assembly adapted to receive an appliance thereon, said support assembly having a pair of spaced apart, substantially parallel rails for the receipt thereon of such appliance, an elongated transverse support disposed and adjacent to and beneath the opposite ends of said rails for supporting the same thereon and having lateral openings therethrough below said rails, and intermediate support legs in engagement upon their upper ends with the respective rails resting thereon for supporting the same, means extending through said openings and engaging said side walls for selectively adjusting the vertical location of said transverse supports with respect to said stand, and means for correspondingly adjusting the height of said legs, the openings in said transverse supports comprising elongated, vertically extending slots, and said selective adjusting means comprising bolt assemblies extending through said slots to secure said transverse supports to said side walls, vertical adjustment of said tranverse supports being accomplished below the rails and by shifting the position thereof within the limits defined by said slots.

9. In a griddle stand having sheet metal side walls, a support assembly adapted to receive an appliance thereon, said support assembly having a pair of spaced apart, substantially parallel rails for the receipt thereon of such appliance, an elongated transverse support disposed and adjacent to and beneath the opposite ends of said rails for supporting the same thereon and having lateral openings therethrough below said rails, and intermediate support legs in engagement upon their upper ends with the respective rails resting thereon for supporting the same, means extending through said openings and engaging said side walls for selectively adjusting the vertical location of said transverse supports with respect to said stand, and means for correspondingly adjusting the height of said legs, each of said transverse supports being equipped with a bracket assembly for each of said rails, and in which means are provided for adjustably positioning said bracket assemblies along said transverse supports for determining the spacing between said rails.

10. In a griddle stand having sheet metal side walls, a support assembly adapted to receive an appliance thereon, said support assembly having a pair of spaced apart, substantially parallel rails for the receipt thereon of such appliance, an elongated transverse support disposed and adjacent to and beneath the opposite ends of said rails for supporting the same thereon and having lateral openings therethrough below said rails, and intermediate support legs in engagement upon their upper ends with the respective rails resting thereon for supporting the same, means extending through said openings and engaging said side walls for selectively adjusting the vertical location of said transverse supports with respect to said stand, means for correspondingly adjusting the height of said legs, each of said support legs comprising a collar secured to said stand, a generally vertical leg post slidably receivable within said collar, and a seat support providing a continuous channel therein for receiving one of said rails, and a depending collar slidably receiving an end of said leg post therein, said leg post being severable of two overlapping elements to afford adjustment of the length thereof to provide the aforesaid means for adjusting the height of said legs, the openings in said transverse supports comprising elongated, vertically extending slots, and said selective adjusting means comprising bolt assemblies extending through said slots to secure said transverse supports to said side walls, vertical adjustment of said transverse support being accomplished below the rails and by shifting the position thereof within the limits defined by said slots, each of said transverse supports being equipped with a bracket assembly for each of said rails, and in which means are provided for adjustably positioning said bracket assemblies along said transverse supports for determining the spacing between said rails.

11. In a griddle stand having an appliance shelf, a pair of rail segments extending along said shelf in substantially parallel relation therewith, one of said segments being oriented at a greater elevation than the other above said shelf, a first tubular leg member carried at its lower end on said shelf and extending upwardly therefrom adjacent to an end of the lowermost rail segment, a seat support carried by said leg member on the upper end thereof and receiving such end of the lowermost rail segment in resting relationship thereon whereby such end is supported by said leg member, a second leg member of smaller diameter telescopically received within said first leg member through said seat support in close clearance therewith and extending upwardly from said first leg member, means carried by said first leg member for supporting the second leg member at a selected position of telescopic relationship to locate the top of the second leg member adjacent to the end of said rail segment having the greater elevation, and a seat support carried by said second leg member on the upper end thereof and receiving thereon such end of the rail segment having the greater elevation whereby that rail segment is supported by said second leg members.

References Cited in the file of this patent

UNITED STATES PATENTS

| | | |
|---|---|---|
| 799,544 | Dennis | Sept. 12, 1905 |
| 1,044,889 | Hyde | Nov. 19, 1912 |
| 1,150,781 | Louden | Aug. 17, 1915 |
| 1,423,927 | Falk | July 25, 1922 |
| 1,569,358 | Cross | Jan. 12, 1926 |
| 2,107,660 | Cichocki | Feb. 8, 1938 |
| 2,192,038 | Hansen | Feb. 27, 1940 |
| 2,359,109 | Hormes | Sept. 26, 1944 |
| 2,639,042 | Lambert | May 19, 1953 |